United States Patent
Mundkowski

[11] Patent Number: 5,857,747
[45] Date of Patent: Jan. 12, 1999

[54] DRIVER'S SEAT FOR A MACHINE

[75] Inventor: Rudolf Mundkowski, Aschaffenburg, Germany

[73] Assignee: Linde Aktiengesellschaft, Germany

[21] Appl. No.: 820,485

[22] Filed: Mar. 18, 1997

[30] Foreign Application Priority Data

Mar. 21, 1996 [DE] Germany .................. 196 11 206.0
Dec. 2, 1996 [DE] Germany .................. 196 49 886.4

[51] Int. Cl.[6] .................................................. A47C 7/50
[52] U.S. Cl. .................. 297/423.11; 297/423.12
[58] Field of Search ................ 297/423.11, 423.12, 297/466, 217.3, 423.25, 423.13; 296/65.1

[56] References Cited

U.S. PATENT DOCUMENTS

| | | |
|---|---|---|
| 1,065,022 | 6/1913 | Bell .............................. 297/423.12 X |
| 3,076,517 | 2/1963 | Henry-Biabaud ................... 296/65.1 X |
| 4,802,542 | 2/1989 | Houston et al. ................ 297/423.11 X |
| 5,054,852 | 10/1991 | Tholkes ........................... 297/423.12 X |
| 5,149,174 | 9/1992 | Charash ............................. 297/423.12 |
| 5,255,957 | 10/1993 | Opsvik et al. ..................... 297/423.12 |
| 5,524,721 | 6/1996 | Yamauchi ......................... 296/65.1 X |

FOREIGN PATENT DOCUMENTS 1734679 5/1992 U.S.S.R. ........................... 297/423.12

*Primary Examiner*—Laurie K. Cranmer
*Attorney, Agent, or Firm*—Webb Ziesenheim Bruening Logsdon Orkin & Hanson, P.C.

[57] ABSTRACT

A driver's seat for a machine, in particular for an industrial truck, has a seat surface which is inclined forward, a knee rest and a back rest. In one embodiment, the driver's seat swivels and the seat also includes a heel rest and a toe rest. Control elements can be located on the swivelling driver's seat in the vicinity of the knee rest, the heel rest and/or the toe rest.

10 Claims, 2 Drawing Sheets

DRIVER'S SEAT FOR A MACHINE

BACKGROUND OF THE INVENTION

1. Field of the Invention

This invention relates to a driver's seat for a vehicle, in particular to a driver's seat for an industrial truck.

2. Background Information

The driver's seat of an industrial truck is generally located in an open or closed driver's cab. The cab comprises, in addition to the driver's seat, a number of control elements such as a steering wheel, various switches, levers and foot pedals.

During the operation of industrial trucks, situations frequently occur in which the driver's view is directed sideways or toward the rear, sometimes for an extended period. On forklift trucks, it is often necessary to travel backward for long distances, in particular when transporting large loads which obstruct the driver's view.

On large trucks which have relatively large cabs, the known driver's seat can be made to swivel around a vertical axis. At least some of the control elements are thereby moved along with the driver's seat, or are available in more than one location. Thus the driver can assume the desired seated position at any time and still have access to the control elements. In this manner, the driver is able to assume an ergonomically favorable body position even when the vehicle is traveling in reverse.

On smaller trucks, the amount of free space available inside the driver's cab is frequently not sufficient to place the driver's seat in an ergonomically efficient position, and to simultaneously make possible a swivelling of the driver's seat and control elements. The object of this invention is to make available an ergonomically favorable driver's seat which minimizes the space occupied by the driver's seat and the driver.

SUMMARY OF THE INVENTION

The above object can be accomplished by providing the driver's seat with a seat surface which is inclined forward, and by providing at least one knee rest in the vicinity of the seat surface.

On a seat according to the invention, the driver sits with his thighs inclined downward on the seat surface which itself is inclined forward. The driver supports himself with his knees on a knee rest. The driver's knees are thereby bent so that the calves are in a vertical position, or are inclined toward the rear. As a result of the inclination of his thighs and his bent knees, the seated driver does not take up very much room in the forward direction.

In one embodiment of the invention, the driver's seat has a back rest. The back rest makes it possible for the driver to assume a relaxed body position when he is seated. The back rest is ergonomically advantageous, in particular when the driver is required to remain seated in the cab for extended periods.

The driver's seat may have at least one heel rest. The heel rest defines the position of the driver's legs relative to the driver's seat. The driver's seat may have at least one toe rest. The heel rest and/or the toe rest allows the driver to keep his legs in a relaxed position.

In one embodiment of the invention, the driver's seat is fastened to a frame of the vehicle so that the driver's seat can swivel around a vertical axis. The driver's seat may be constructed to position or support the driver's legs in any position which is defined by the seat.

The maximum angle of rotation of the driver's seat is less than or equal to 180°, and is preferably less than or equal to 90°. The ergonomically optimum position for reverse travel of the vehicle is reached when the driver's seat is rotated by 180°. A rotation of the driver's seat by 90° is preferably selected when a frequent change in the driver's angle of vision, e.g., from the road to the load, is necessary.

The driver's seat can be fastened to the frame of the vehicle using spring elements and/or damping elements. The impacts which occur during the operation of the vehicle are thereby cushioned and damped to take a load off the driver's knee joints and spinal column.

In one embodiment of the invention, the knee rest is fastened to a frame of the industrial truck. This results in a driver's seat with a particularly simple configuration. Because there is no additional mounting on the driver's seat for the knee rest, the driver does not encounter any interference as he enters or exits the vehicle.

Spring elements and/or damping elements may be located on the knee rests such that the knee rest can move slightly in the vertical direction. The driver's joints are protected by the cushioning or damping of the knee rest.

In one embodiment of the invention, at least one control element is located in the vicinity of the knee rest. The control element is thereby provided for actuation with the operator's knees. When the control elements are laid out in this manner, the functions "forward travel", "reverse travel" and "braking" can be actuated in the same manner in any position of the driver's seat, because the control elements are moved with the knee rest of the driver's seat.

In one embodiment of the invention, at least one control element is located in the vicinity of the heel rest. In this embodiment, the control element can be operated by the driver with the heel area of his shoe in any position of the driver's seat.

In one embodiment of the invention, at least one control element is located in the vicinity of the toe rest. The control element be actuated using the driver's toes, regardless of the angle of rotation of the driver's seat.

The location of the control elements according to the present invention have the advantage that the control elements are fastened to the driver's seat, and are therefore moved along with the driver's seat. The driver is therefore able to actuate the control elements at any time with the same movements of his feet or legs.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
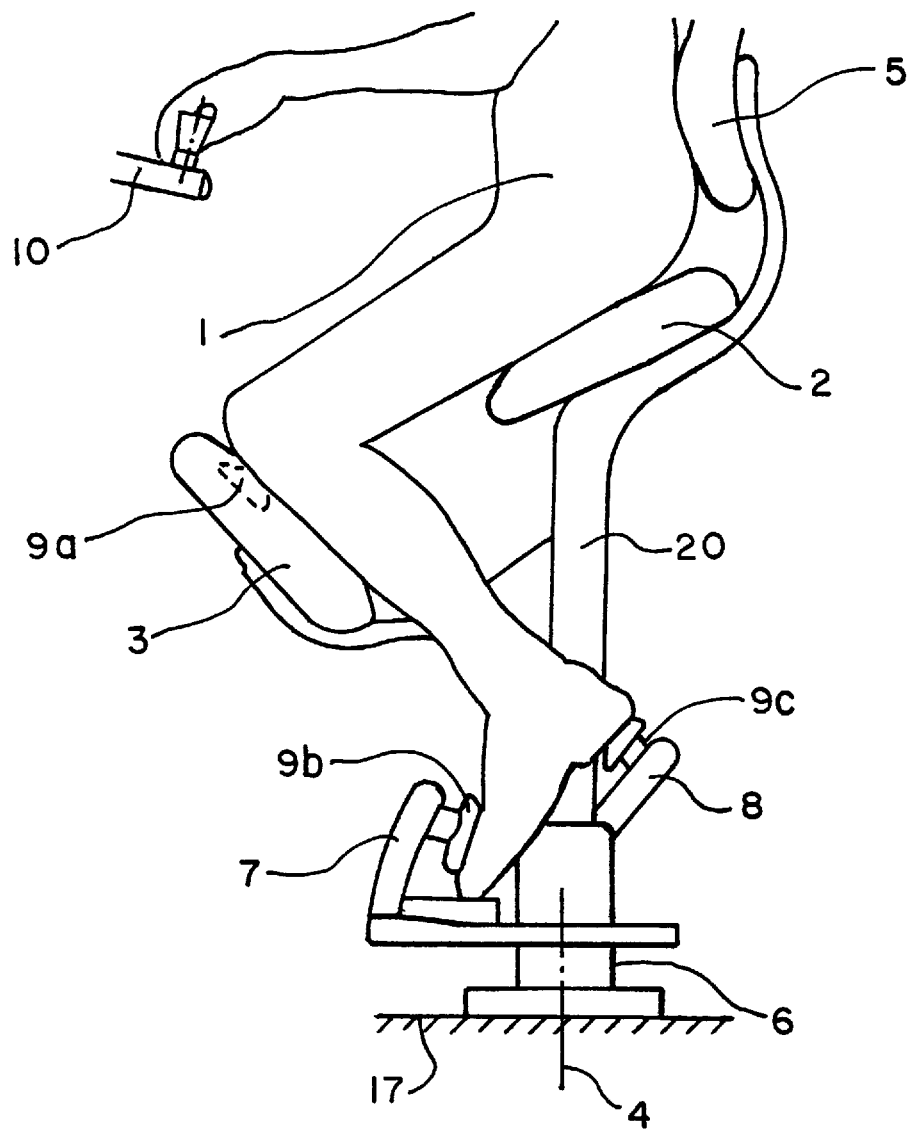
FIG. 1 shows a driver's seat according to the present invention.

FIG. 1 illustrates a driver's seat according to the present invention. The driver 1 sits on a seat surface 2 which is inclined forward. The seat surface 2 is attached to a seat frame 20. To reduce the load on the spinal column, a back rest 5, attached to the seat frame 20, is located in the vicinity of the driver's back. The driver's knees are supported on a knee rest 3 which is attached to the seat frame 20. The driver's thighs are thereby inclined forward and down, and his calves toward the rear and down. This position of the driver's legs, compared to a conventional driver's seat, means that the driver occupies less space in the frontal direction. The reduced space requirement makes it possible to install the driver's seat so that it can swivel around a vertical axis 4, even in small driver's cabs.

In the illustrated embodiment, the driver's seat is fastened to a floor 17 of the driver's cab by a mounting 6 which supports the seat frame 20. The mounting 6 makes it possible to stop and swivel the driver's seat around the axis 4. A spring and damping mechanism is integrated into the mounting 6 of the driver's seat, such that the transmission of impacts and vibrations to the driver's seat is reduced.

A toe rest 7 and a heel rest 8 are attached to the seat frame 20 in the lower portion of the driver's seat to define the position of the operator's feet. Various control elements 9a–9c, e.g., for the actuation of the drive system, can be provided in the vicinity of the driver's legs. In the illustrated embodiment, control element 9a is provided in the vicinity of the knee rest 3. Additional control elements 9b, 9c are fastened to the toe rest 7 and the heel rest 8. The control elements 9a, 9b and 9c are moved with the seat as it swivels, so that their position relative to the driver remains constant.

A steering wheel 10 located within reach of the driver's hand can be stationary relative to the cab, if the maximum angle of rotation of the driver's seat does not exceed a value of approximately 90°. But if the angle of rotation exceeds this value, it is necessary either to swivel the existing steering wheel 10 together with the driver's seat, or to provide a second steering wheel. Beyond a swivelling angle of 90°, the direction of rotation of the steering wheel should be reversed, so that the customary orientation of the steering direction with regard to the direction of travel can be maintained.

Figure 2:
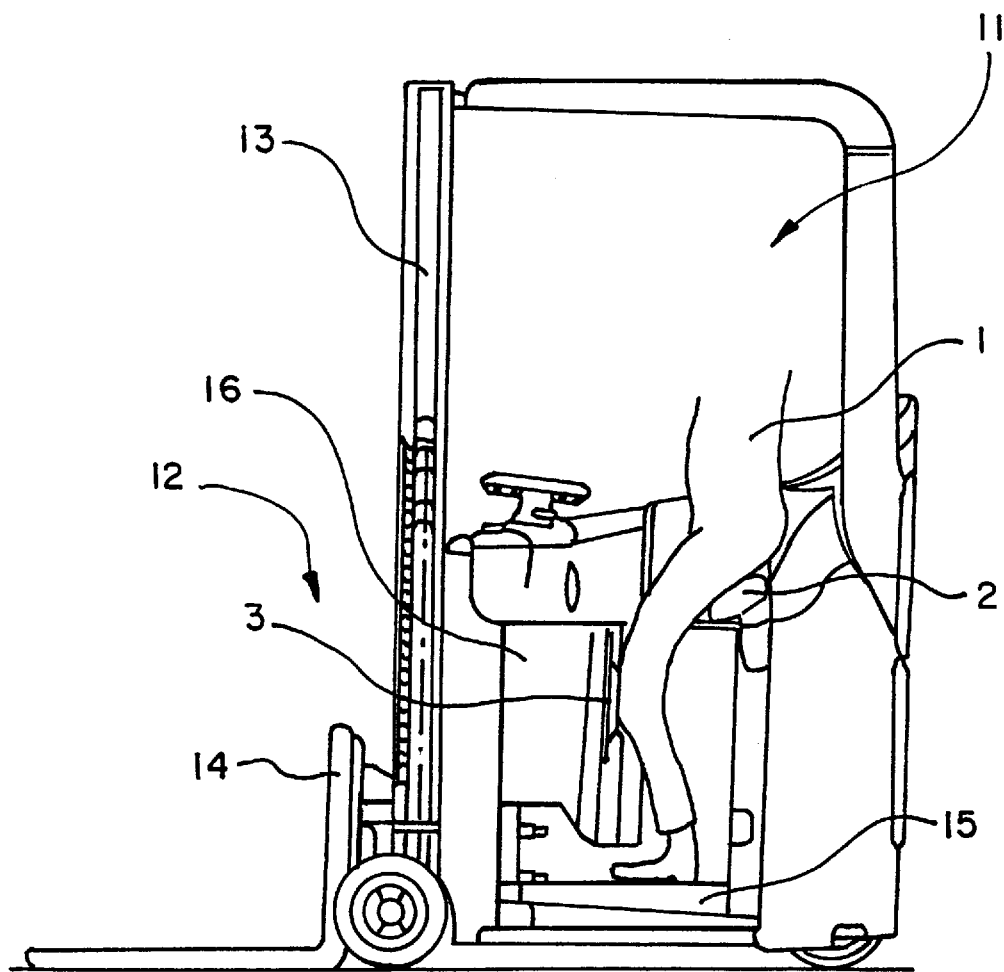
FIG. 2 shows an industrial truck with a driver's seat according to another embodiment of the present invention.

FIG. 2 shows an industrial truck which has a driver's seat according to the present invention. The industrial truck has a control cab 11 and a load part 12. A load fork 14 is fastened so that it can move up and down on a load mast 13 of the load part 12.

In the driver's cab 11 there is a driver's seat with a seat surface 2 inclined forward. While the driver is seated, the feet of the driver 1 rest on a platform 15. The driver's knees are supported on a knee rest 3 positioned in the vicinity of the seat surface 2 and which is fastened to a frame 16 of the industrial truck by means of spring and damping elements.

With this layout of the driver's cab, the driver of the industrial truck can operate the truck either in a half-seated/half-standing position or in a standing position. The driver's seat presents no interference to the driver's entry into the industrial truck.

While the invention is described in detail herein, it will be appreciated by those skilled in the art that various modifications and alternatives to the arrangements can be developed in light of the overall teachings of the disclosure. Accordingly, the particular arrangements are illustrative only and are not limiting as to the scope of the invention which is to be given the full breadth of the appended claims and any and all equivalents thereof.

What is claimed is:

1. An industrial truck comprising:
   a plurality of wheels;
   a frame supported on said wheels;
   a driver's cab supported on said frame, wherein a driver is positioned within said driver's cab for operating said truck; and
   a driver's seat in said driver's cab, said driver's seat including;
   a seat surface inclined forward, wherein in use, the driver's thighs are inclined forward and down, and
   at least one knee rest located in a vicinity of said seat surface, wherein said knee rest is fastened to said frame of said industrial truck.

2. A driver's seat as claimed in claim 1, further including damping elements on said knee rest connecting said knee rest to the frame of the vehicle.

3. An industrial truck comprising:
   a plurality of wheels;
   a frame supported on said wheels;
   a driver's cab supported on said frame, wherein a driver is adapted to be positioned within said driver's cab for operating said truck;
   a driver's seat in said driver's cab, said driver's seat including;
   a seat surface inclined forward, wherein in use the driver's thighs are inclined forward and down;
   at least one knee rest located in a vicinity of said seat surface and spaced from said seat surface; and
   a mounting attached to said frame of said industrial truck, said mounting pivotally supporting said seat surface and said at least one knee rest for pivotable movement about a vertical axis.

4. An industrial truck as claimed in claim 3 further including a seat frame supporting said seat surface and said at least one knee rest and pivotally attached to said mounting for rotation about said substantially vertical axis relative to said industrial truck frame.

5. The industrial truck of claim 4 wherein a maximum angle of rotation of said seat frame has a value less than or equal to 180°.

6. The industrial truck of claim 5 further including a back rest attached to said seat frame, at least one heel rest attached to said seat frame and at least one toe rest attached to said seat frame.

7. The industrial truck of claim 6 further including a control element located in one of the group comprising of said knee rest, said toe rest and said heel rest.

8. The industrial truck of claim 4 wherein said mounting includes suspension elements incorporated therein, wherein said driver's seat is fastened to the frame of the industrial truck by said suspension elements.

9. The industrial truck of claim 8 further including a load part coupled to said industrial truck frame, said load part including a load mast and a load fork movable on said load mast.

10. The industrial truck of claim 9 wherein said substantially vertical axis extends through said seat surface.

* * * * *

UNITED STATES PATENT AND TRADEMARK OFFICE
CERTIFICATE OF CORRECTION

PATENT NO. : 5,857,747
DATED : January 12, 1999
INVENTOR(S) : Rudolf Mundkowski

It is certified that error appears in the above-identified patent and that said Letters Patent is hereby corrected as shown below:

Claim 1 Column 4 Line 9 after "including" delete semicolon and insert --:--.

Claim 3 Column 4 Line 26 after "including" delete semicolon and insert --:--.

Signed and Sealed this

Eighth Day of June, 1999

Attest:

Q. TODD DICKINSON

*Attesting Officer*     *Acting Commissioner of Patents and Trademarks*